May 7, 1935. T. C. DELAVAL-CROW 2,000,276
BEARING AND GUARD THEREFOR
Filed Feb. 4, 1932
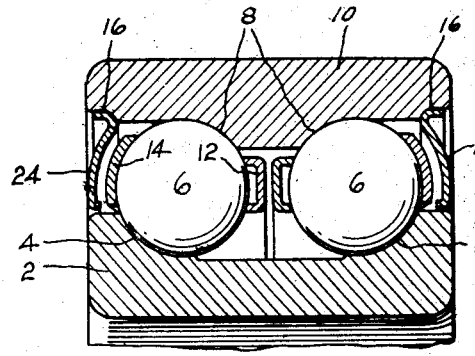
Fig. 1
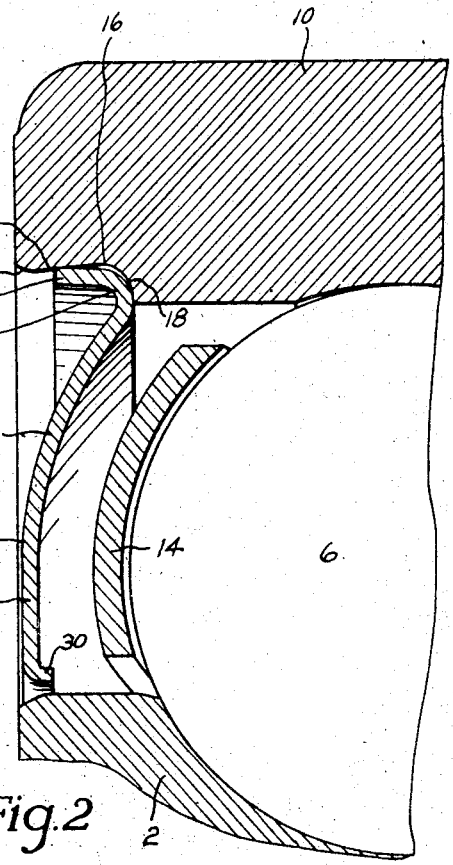
Fig. 3
Fig. 2
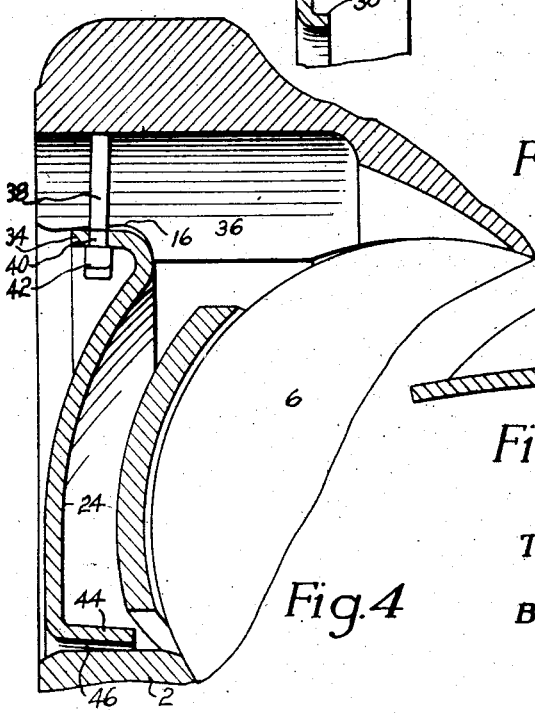
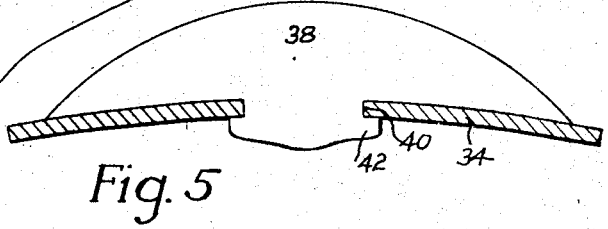
Fig. 5
Fig. 4
INVENTOR:
THOMAS C. DELAVAL-CROW,
BY
HIS ATTORNEY.

Patented May 7, 1935

2,000,276

UNITED STATES PATENT OFFICE 2,000,276

BEARING AND GUARD THEREFOR

Thomas C. Delaval-Crow, Bristol, Conn., assignor, by mesne assignments, to General Motors Corporation, Detroit, Mich., a corporation of Delaware Application February 4, 1932, Serial No. 590,846

14 Claims. (Cl. 29—84)

This invention relates to bearings and guards therefor and comprises all of the features of novelty herein disclosed. An object of the invention is to provide an improved guard or shield for closing the side of a bearing to retain lubricant and/or exclude foreign matter. To this end and to improve generally upon devices of this character, the invention consists in the various matters hereinafter described and claimed. In its broader aspects, the invention is not necessarily limited to the specific constructions selected for illustrative purposes in the accompanying drawing in which Fig. 1 is a cross sectional view of a portion of a ball bearing having the improved guard.

Fig. 2 is a cross sectional view (greatly enlarged) of a portion of the bearing.

Fig. 3 is a cross sectional view of the guard of Fig. 2, prior to its attachment to the bearing.

Fig. 4 is a cross sectional view of a modification.

Fig. 5 is a side view of parts shown in Fig. 4.

In Fig. 1, an inner race ring 2 is provided with a pair of angular contact raceways 4 for rolling elements preferably in the form of balls 6 running on co-operating raceway 8 carried by an outer race ring 10. The rolling elements of each row are spaced by any suitable separator or cage herein shown as composed of rings 12 and 14 one of which is transversely curved to conform to the side surfaces of the balls. One of the race rings, preferably the outer one, is provided near the sides with peripheral grooves 16. Each groove has its inner side wall 18 making a shoulder formed by a transversely curved surface, preferably arcuate, with a center of curvature about in the plane of the middle of the groove. The outer side wall 20 of each groove is shallow and is preferably formed by a long conical taper merging at one end with the arcuate side wall and merging at the other end with a convexly rounded land or chamfer 22. The outer end of the conical wall at the land 22 is nearer to the opposed race ring than its inner end and so forms an overhang.

The guard comprises a sheet metal plate or ring 24 wholly contained in the space between the race rings and having a side wall portion 26 which is preferably flat and merges smoothly with a tapered wall portion 28. One edge of the ring terminates in a flange 30 extending laterally towards the rolling elements and having close running clearance with the adjacent surface of the race ring 2. The tapering wall portion 28 desirably has a transverse curvature which gives its concave inner surface a uniform spacing from the adjacent rolling elements or their separator ring 14 and so will be transversely arcuate when the rolling elements are balls. The wall portion 28 merges smoothly with a fold or reverse bend 32 which preferably has a transversely arcuate form of approximately the same radius as the wall 18 of the groove. Projecting laterally from the terminus of the reverse bend and outwardly over and around the side wall is a resilient tapering flange 34 whose inherent elasticity expands it into the slanting relation shown in Fig. 3. The outer edge of the flange is then of a diameter which requires temporary distortion to pass the land 22. Lateral pressure on the guard will cause the rounded land to cam the laterally and outwardly slanting flange inwardly as the guard is pressed into the groove. The reaction of the resilient flange with the overhanging or tapering wall 18 creates a force holding the reverse bend against the side wall 18. The flange meets the tapering wall at an angle which may be described as a cutting angle inasmuch as the angle is designed to be just great enough to make the flange tend to dig into the tapering wall like a cutting tool and thus resisting removal of the guard. The guard thus comprises a stiff body portion, produced by the curvature or tapering of the wall portion 28, and a resilient flange merging with the body portion by a reverse bend. Inasmuch as the overhang of the conical wall 20 is shallow and the resilient flange 34 increases gradually in diameter towards its edge and the adjacent side of the race ring, flexing or compression of the flange alone will provide for easy application of the guard to the groove without any tool, the guard nevertheless being reliably locked by the edge contact of the flange with the groove.

The double-row bearing of Fig. 1 has a filling slot on one side as indicated to a large scale in Fig. 4 wherein a transverse filling slot 36 intersects the peripheral groove 16. In the illustrated bearing, the filling slot has side walls which are substantially in the surface of a cylinder parallel to the bearing axis and the slot is filled transversely by a segmental or crescent-shaped plate 38. The plate conforms to the slot walls and to the exterior surface of the resilient flange 34. The flange is perforated to admit a shank 40 which is headed over as at 42 to connect the plate to the flange. The plate 38 obviously will not interfere with the bending of the resilient flange because it is pulled towards the inwardly open side of the filling slot as the flange passes inside of the land 22. The plate also acts as a keying extension to hold the guard from rotation. To further insure against the escape of lubricant, the guard 24 may have a tapering flange 44 projecting laterally towards the rolling elements and making a capillary angle with the adjacent surface of the inner race ring. When this angle is approximately three or four degrees, a capillary space is formed at 46 which tends to retain lubricant in the bearing. Any lubricant reaching the tapering space is actually drawn by capillary action in the direction in which the walls converge or back towards the rolling elements, somewhat as ink on a drawing pen is drawn towards the points.

I claim:

1. In an antifriction bearing and guard, an inner race ring, an outer race ring, a series of rolling elements, one of the race rings having a groove near one side, the inner side wall of the groove forming a shoulder, the outer side of the groove being formed by an overhanging conical wall, a sheet metal plate closing the space between the race rings and comprising a side wall having a tapered stiffening portion merging at its periphery with a bent portion which abuts against the shoulder, and a terminal resilient flange extending laterally and outwardly from the bent portion at an angle to the overhanging conical wall, the reaction of the resilient flange against the conical wall urging the bent portion against the shoulder, the flange increasing in diameter towards its edge whereby flexing of the flange alone provides for snapping it into the groove; substantially as described.

2. In an antifriction bearing and guard, an inner race ring, an outer race ring, a series of rolling elements, one of the race rings having a groove near one side, the groove being bounded on one side by a transversely curved surface, the other side of the groove being formed by a tapering surface merging with the curved surface, a sheet metal plate closing the space between the race rings and comprising a side wall having a tapered stiffening portion merging at its periphery with a reverse bend, the reverse bend having a curvature approximately the same as that at the one side of the groove and engaging said side of the groove, and a resilient tapering flange extending laterally and outwardly from the terminus of the reverse bend, said flange increasing in diameter towards its edge and meeting the tapering wall of the groove at a cutting angle, and the closure plate being wholly contained in the space between the race rings; substantially as described.

3. In an antifriction bearing and guard, an inner race ring, an outer race ring, a series of rolling elements whose side surfaces are convex, one of the race rings having a groove near one side, the groove being bounded on its inner side by a transversely curved surface, the outer side of the groove being formed by a tapering surface merging with the curved surface, a sheet metal plate closing the space between the race rings and comprising a side wall having a transversely curved stiffening portion substantially uniformly spaced from the convex side surfaces of the rolling elements, said stiffening portion merging at its periphery with a reverse bend engaging the inner side of the groove, and a resilient flange slanting laterally and outwardly over the curved side wall from the terminus of the reverse bend, said flange increasing in diameter towards its edge and being disposed at a cutting angle to the tapering surface of the groove; substantially as described.

4. In an antifriction bearing and guard, an inner race ring, an outer race ring, a series of rolling elements, one of the race rings having a peripheral groove near one side, a sheet metal ring closing the space between the race rings and comprising a tapered side wall merging at one periphery with a reverse bend engaging the inner side of the groove, a flange extending outwardly from the reverse bend and engaging the outer side of the groove, and the side wall having a flange extending laterally towards the rolling elements from its other periphery and lying at a capillary angle to the adjacent surface of the other race ring; substantially as described.

5. In an antifriction bearing and guard, an inner race ring, an outer race ring, a series of rolling elements, one of the race rings having a groove, a sheet metal ring engaging the groove, the ring having a flange projecting laterally towards the rolling elements and making a capillary angle with the adjacent surface of the other race ring; substantially as described.

6. In a unit-handling antifriction bearing and guard, an inner race ring, an outer race ring, a series of rolling elements, one of the race rings having a transverse slot at one side, and a guard ring closing the space between the race rings and having an extension projecting from one periphery thereof and fitting in the slot; substantially as described.

7. In a unit-handling antifriction bearing and guard, an inner race ring, an outer race ring, a series of rolling elements, one of the race rings having a peripheral groove near one side and a transverse filling slot intersecting the groove, a sheet metal guard closing the space between the race rings and entering the groove, a plate fitting in the filling slot, and means for securing the plate to the guard; substantially as described.

8. In a unit-handling antifriction bearing and guard, an inner race ring, an outer race ring, a series of rolling elements, one of the race rings having a peripheral groove near one side and a transverse filling slot intersecting the groove, a sheet metal guard closing the space between the race rings, the guard having a holding flange extending laterally of the groove, and a plate fitting in the filling slot and attached to the flange; substantially as described.

9. In a device of the character described, a race ring having a groove, the outer side wall of the groove gradually decreasing in diameter towards the adjacent side of the race ring to provide a shallow overhang, a guard plate carried by the race ring and having a stiff body portion of a size to clear the overhang and a resilient terminal flange, the resilient flange projecting laterally from the stiff body portion and gradually increasing in diameter towards the adjacent side of the race ring to present a surface which slants laterally and outwardly and is inherently of a size to encounter the overhang when pressed laterally against it, and the slanting flange being compressible to cam itself within the overhang upon such lateral pressure, and the compressed flange meeting the overhanging side wall of the groove at a cutting angle; substantially as described.

10. In an antifriction bearing, an inner race ring, an outer race ring, a series of rolling elements, a guard plate having one periphery attached to one of the race rings, the other periphery having a flaring flange projecting laterally towards the rolling elements and making a capillary angle of approximately four degrees with the adjacent surface of the remaining race ring; substantially as described.

11. In an antifriction bearing having inner and outer race rings and rolling elements, a guard plate lying wholly between the race rings and having a stiffened side wall whose periphery is connected to a laterally extending resilient flange, the outer race ring having a groove with a shoulder at one side and a slanting overhang at the other side, the flange extending laterally away from the shoulder and increasing in diameter to the edge, said edge meeting the slanting overhang at a cutting angle to resist removal of the guard plate and hold it against the shoulder; substantially as described.

12. In an antifriction bearing having inner and outer race rings and rolling elements, the outer race ring having a groove with a shoulder on one side and a slanting overhang on the other side, the overhang decreasing in diameter and merging with a rounded land, a guard plate having a stiff body wall whose outer periphery is connected to a resilient flange extending away from the shoulder and increasing in diameter therefrom to a diameter greater than that of the rounded land whereby the rounded land will cam the resilient flange inwardly behind the overhang where the edge of the flange meets the slanting overhang at a cutting angle; substantially as described.

13. The method of attaching a guard plate having a side wall whose periphery is connected to an outwardly slanting resilient flange, to a race ring having a groove with a shoulder at its inner side and a slanting overhang at the outer side, which consists in pressing the guard plate towards the side of the race ring with the resilient flange slanting laterally and outwardly with respect to the race ring, camming the resilient flange towards the axis of the ring by reaction of its outwardly slanting surface with the material overhanging the groove, whereby the edge of the flange resiliently engages the slanting overhang and so resists removal while also urging the guard plate against the shoulder; substantially as described.

14. In an antifriction bearing and guard, a pair of co-operating race rings with rolling elements between them, one of the race rings having an annular groove and a slot intersecting the groove, a guard ring closing the space between the race rings with one periphery entering the groove, and the guard ring having an extension projecting radially from the periphery and entering said intersecting slot; substantially as described.

THOMAS C. DELAVAL-CROW.